United States Patent
Morgan et al.

[19]

[11] Patent Number: 6,109,415
[45] Date of Patent: Aug. 29, 2000

[54] BI-DIRECTIONAL BALLSCREW NO-BACK DEVICE

[75] Inventors: Bruce E. Morgan, Woodinville; Henry A. Zebroski, Jr., Seattle, both of Wash.

[73] Assignee: The Boeing Company, Seattle, Wash.

[21] Appl. No.: 09/087,394

[22] Filed: May 29, 1998

[51] Int. Cl.[7] .................................................. F16H 27/02
[52] U.S. Cl. ......................................................... 192/223.1
[58] Field of Search ............................... 192/223.1, 223; 244/75 R

[56] References Cited

U.S. PATENT DOCUMENTS

| | | |
|---|---|---|
| 3,583,248 | 6/1971 | Langenberg . |
| 4,030,578 | 6/1977 | Cacciola et al. . |
| 4,459,867 | 7/1984 | Jones . |
| 4,625,843 | 12/1986 | Maltby et al. . |
| 4,697,672 | 10/1987 | Linton ................................. 192/223 X |
| 4,762,205 | 8/1988 | Ortman . |
| 4,850,458 | 7/1989 | Allan et al. . |
| 5,299,666 | 4/1994 | Lang et al. . |
| 5,568,704 | 10/1996 | Williams et al. .................... 192/223 X |
| 5,582,390 | 12/1996 | Russ . |
| 5,655,636 | 8/1997 | Lang et al. . |

*Primary Examiner*—Rodney H. Bonck
*Attorney, Agent, or Firm*—Christensen O'Connor Johnson & Kindness PLLC

[57] ABSTRACT

A section of an upright ballscrew having a transverse, horizontal ballscrew flange is received in a housing that allows limited axial (up and down) movement of the ballscrew, in opposite directions from a central position. The ballscrew receives and transfers a bi-directional axial and torque load from an external source, such as the load resulting from the horizontal stabilizer hinge moment in an aircraft trim actuator. When under compression the ballscrew flange is pressed downward against a bottom multistage brake which includes lower skewed roller brake disks. Similarly, tension applied to the ballscrew lifts the ballscrew flange against a top multi-stage brake including upper skewed roller brake disks. The brakes include ratchet wheels which control the direction of braking force application depending on whether the ballscrew is under tension or under compression, and mechanism for centering the load on the rollers of the brake disks.

2 Claims, 7 Drawing Sheets

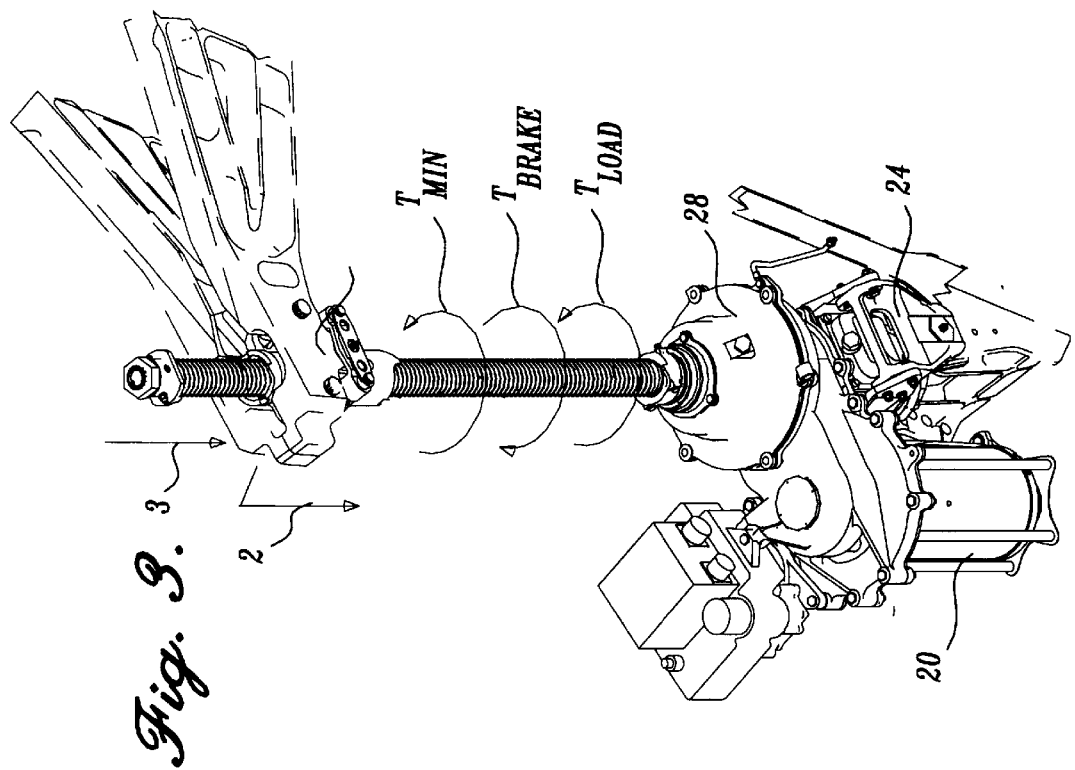
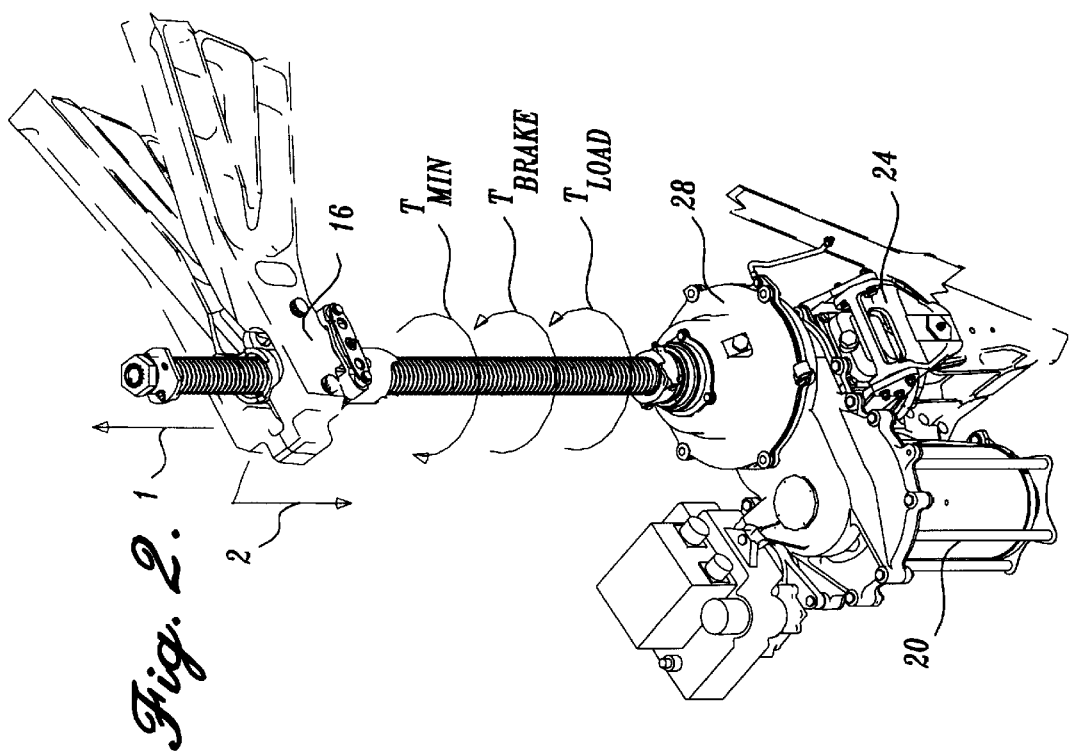

BI-DIRECTIONAL BALLSCREW NO-BACK DEVICE

FIELD OF THE INVENTION

The present invention relates to a compact, consistent, bi-directional, no-back device for a ballscrew drive, particularly a ballscrew drive of the type used in horizontal stabilizer trim actuators of commercial aircraft.

BACKGROUND OF THE INVENTION

Modern commercial aircraft have horizontal stabilizers that pivot relative to the airplane fuselage to "trim" the aircraft during flight, i.e., adjust the position of the horizontal stabilizer to accommodate for different load distributions within the aircraft. One common horizontal stabilizer trim actuator consists of a ball nut mounted in a gimbal at the leading edge of the center of the horizontal stabilizer structure, and an upright ballscrew extending through the ball nut. The ballscrew, in turn, has its bottom end mounted in a lower gimbal secured to the fuselage. By rotating the ballscrew in one direction, the leading edge of the horizontal stabilizer is moved up, whereas by rotating the ballscrew in the other direction, the leading edge of the horizontal stabilizer is moved down. Rotation of the ballscrew can be by an electric motor and associated gearing.

The horizontal stabilizer hinge moment is transmitted through the stabilizer gimbal and ball nut to the ballscrew. This load has a vertical component as well as a torque component due to ballscrew lead (threads). Depending on whether the stabilizer is nose up or nose down, the vertical load may be either compressive or tensile. To prevent freewheeling of the ballscrew due to the aerodynamic load on the horizontal stabilizer, some type of brake must be provided, but the brake must not prevent all rotation of the ballscrew because trimming in either direction (against or with the aerodynamic induced torque load) may be desirable. These types of brakes are referred to as "no-back" devices, and desirable characteristics are: for a given load, the input torque required is the same for lifting or lowering the load; the device must prevent backdriving by the aerodynamic load with a considerable safety margin; the brake torque variability due to wear, heat, variations in material properties, and manufacturing variability should be as small as possible; the braking force should be consistent, i.e., resistant to brake fade over a long operating life and despite frequent use; and the device should be compact, lightweight and use readily available materials.

SUMMARY OF THE INVENTION

The present invention provides a no-back device for a ballscrew rotatable in opposite directions. The ballscrew has a transverse flange with flat radial surfaces at the top and bottom. A section of the ballscrew, including the ballscrew flange, is received in a housing that allows limited axial movement of the ballscrew in opposite directions from a central position. The ballscrew receives and transfers a bi-directional axial and torque load from an external source, such as the load resulting from the horizontal stabilizer hinge moment in an aircraft trim actuator. When under compression the ballscrew flange is pressed downward against a multi-stage brake which includes lower skewed roller brake discs and mechanism for centering the load on the rollers of the brake discs. Similarly, tension applied to the ballscrew lifts the ballscrew flange against a multi-stage brake including upper skewed roller brake discs and mechanism for centering the load on the rollers of the brake discs. The brakes include ratchet wheels which control the direction of braking force application depending on whether the ballscrew is under tension or under compression. More specifically, each brake applies essentially no force when the ballscrew is rotated in one direction because of freewheeling of the associated ratchet wheel, but the brake must be slipped in order to rotate the ballscrew in the other direction because that ratchet wheel is held stationary relative the housing. The ratchet wheels permit freewheeling in opposite directions for tension and compression loads on the ballscrew, i.e., freewheeling is permitted in one direction when the ballscrew is under tension and in the other direction when the ballscrew is under compression. Thus, for either a compressive or tensile condition, the effective braking force torque is substantially different when the ballscrew is turned in one direction than when it is turned in the other. For an installation in an aircraft horizontal stabilizer actuator, the result achieved is substantial braking force being applied when the ballscrew is turned in a direction assisted by the aerodynamic load on the stabilizer, and very little braking force being applied when the ballscrew is turned in a direction against the aerodynamic load on the stabilizer, resulting in approximately equal force being required to turn the ballscrew in either direction.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 and FIG. 3 are corresponding diagrammatic perspective views of aspects of the no-back device shown in FIG. 1, illustrating the direction of applied braking forces and externally applied loads.

DETAILED DESCRIPTION OF THE PREFERRED EMBODIMENT

Figure 1:
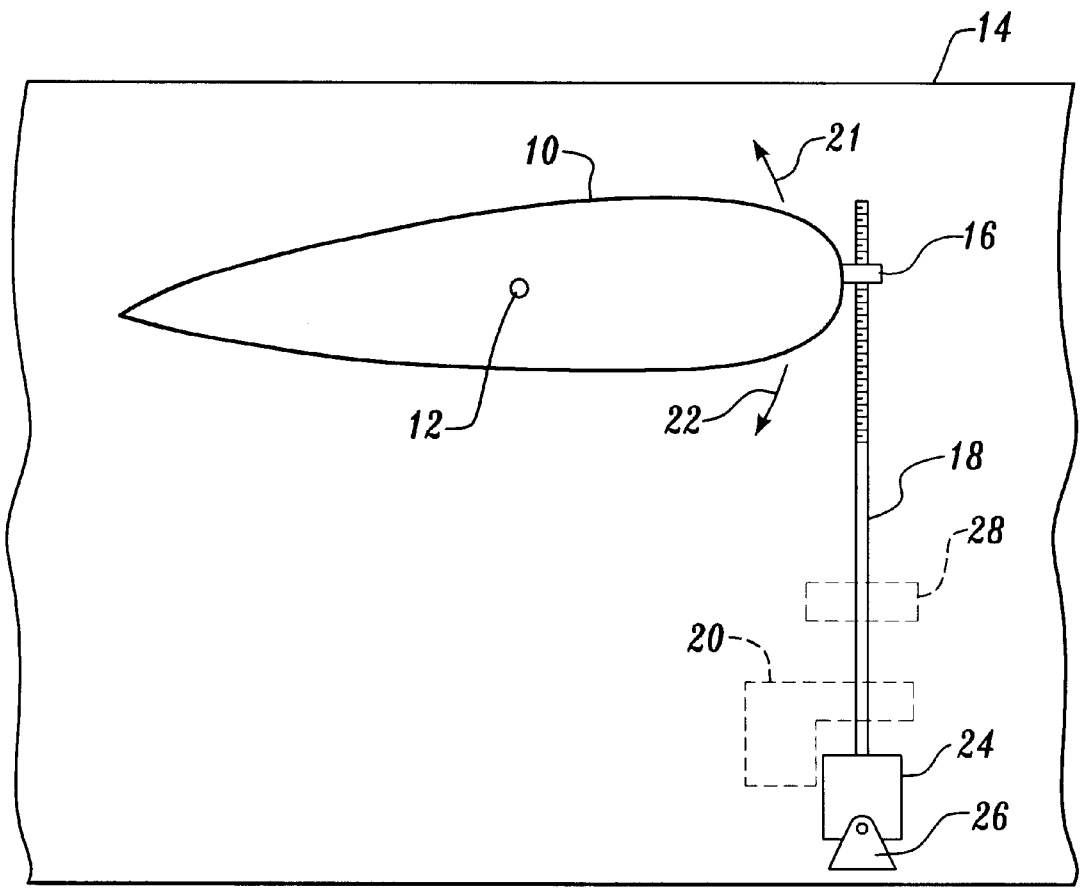
FIG. 1 is a diagrammatic side elevation of an aircraft fuselage illustrating the horizontal stabilizer trim actuator including a bi-directional ballscrew no-back device in accordance with the present invention.

A representative environment for a bi-directional ballscrew no-back device in accordance with the present invention is shown in FIG. 1. The horizontal stabilizer 10 of an aircraft is swingable about a transverse horizontal axis 12 for trimming the aircraft during flight, such as based on the weight distribution of the load carried by the aircraft. Inside the tail section of the airplane fuselage 14, an upper gimbal and ball nut 16 receives an upright ballscrew 18 which can be rotated in either direction by a suitable drive mechanism 20 such as an electric motor and appropriate gearing. The horizontal stabilizer hinge moment is applied to the ballscrew 18 through the gimbal and ball nut 16. This load may be upward directed as represented by the arrow 21, in which case a tensile force is applied to the lower portion of the ballscrew, or downward directed as represented by the arrow 22, in which case a compressive force is applied to the ballscrew. At the same time a torque load in one direction or the other is applied to the ballscrew due to the threaded interconnection with the ball nut.

To prevent the aerodynamic load from backdriving the ballscrew, a bidirectional no-back device 24 is provided, mounted in the airplane fuselage by a lower gimbal 26. In case of failure of the no-back device, a conventional secondary brake 28 can be provided. In general, the no-back device provides a force resisting rotation of the ballscrew in a direction that would result in movement of the stabilizer in the direction of the applied aerodynamic force, while applying little or no force resisting rotation of the ballscrew in the direction that would result in movement of the horizontal stabilizer contrary to the direction of the applied aerodynamic force.

In addition, in order for most efficient operation of the drive unit 20, it is desirable that the force necessary for rotating the ballscrew be approximately equal in both directions, regardless of the aiding or opposing force applied as a result of the horizontal stabilizer hinge moment. For example, in FIG. 2 arrow 1 represents the desired direction of travel of the ball nut and arrow 2 represents the direction of axial force applied to the ballscrew 18 by the aerodynamic induced load on the horizontal stabilizer. If the torque applied to the ballscrew as a result of the aerodynamic forces on the horizontal stabilizer is represented as $T_{LOAD}$, then the minimum torque $T_{MIN}$ necessary to turn the ballscrew in a direction opposing the aerodynamic applied force (i.e., to move the ball nut in the direction of arrow 1) will be equal to $T_{LOAD}$ plus any force applied by the brake, i.e.:

$$T_{MIN} = T_{LOAD} + T_{BRAKE} \quad (1)$$

The ideal situation would be for the brake to apply no resistive force in the opposing direction so that $T_{MIN} = T_{LOAD}$, i.e., $T_{BRAKE} = 0$.

With reference to FIG. 3, for the same aerodynamic induced load represented by arrow 2 and $T_{LOAD}$, if $T_{MIN}$ (torque necessary to turn the ballscrew) is in the "aiding" direction, i.e., in the same direction as the $T_{LOAD}$ (i.e., to move the ball nut in the direction of arrow 3), the relationship is as follows:

$$T_{MIN} = -T_{LOAD} + T_{BRAKE} \quad (2)$$

In the ideal relationship, $T_{BRAKE}$ would equal twice $T_{LOAD}$ for the aiding direction, in which case:

$$T_{MIN} = -T_{LOAD} + 2T_{LOAD} = T_{LOAD} \quad (3)$$

In the case of trimming in the opposing direction (FIG. 2), preferably $T_{MIN} = T_{LOAD}$ as noted above, and the ideal brake force is zero. For the aiding direction (FIG. 3), if the brake load $T_{BRAKE}$ is twice the applied torque $T_{LOAD}$, the same torque $T_{MIN}$ would be required to rotate the ballscrew in the aiding direction.

Figure 4:
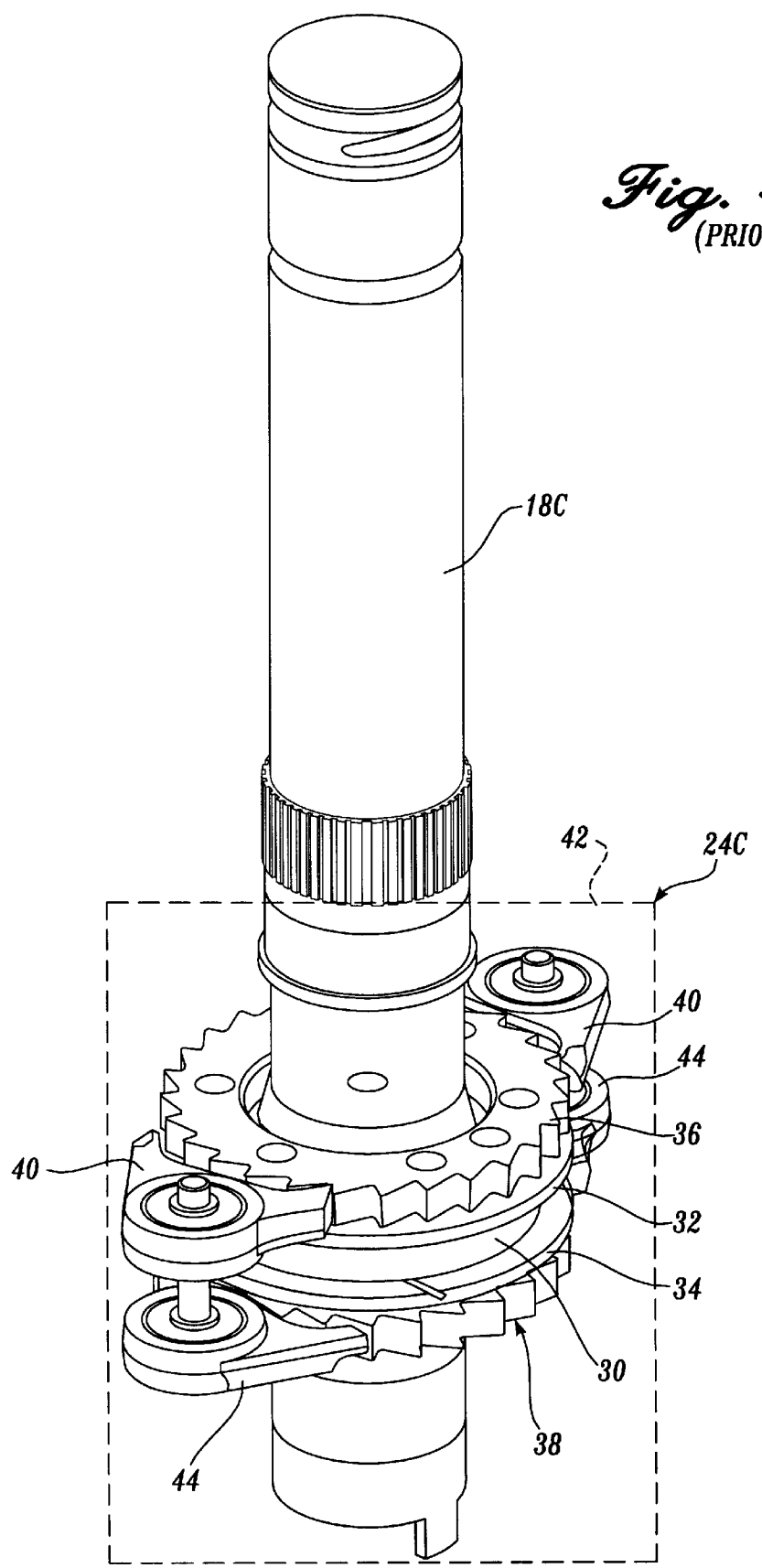
FIG. 4 (prior art) is a top perspective view of a conventional no-back device.

FIG. 4 illustrates the essential components of a conventional no-back device 24c designed for applying substantially greater force in the aiding direction than in the opposing direction. The lower end portion of the conventional ballscrew 18c has an integral radial ballscrew flange 30 with flat upper and lower surfaces. Flange 30 is sandwiched between upper and lower brake disks 32 and 34. An upper ratchet wheel 36 and lower ratchet wheel 38 are mounted for free rotation relative to the conventional ballscrew 18c. Upper pawls 40 are mounted in a stationary housing 42, shown diagrammatically in broken lines, and permit free rotation of the upper ratchet wheel 36 in one direction relative to the housing, but are designed to prevent rotation of the upper ratchet wheel in the other direction relative to the housing. Similarly, lower pawls 44 are mounted in the housing and prevent rotation of the lower ratchet wheel 38 in one direction (the direction opposite that which the upper pawls 40 permit the upper ratchet wheel to turn) and prevent rotation of the lower ratchet wheel in the opposite direction.

In the conventional construction of FIG. 4, the mounting of the pawls, ratchet wheels, brake disks and ballscrew, including the ballscrew flange 30 which turns with the ballscrew, permit some relative axial motion, but that motion is limited. Thus, when the ballscrew is under a substantial downward (compressive) force, the flat undersurface of the ballscrew flange 30 is in tight frictional engagement against the upper surface of the lower brake disk 34, and the undersurface of the brake disk 34 is in tight frictional engagement against the upper surface of the lower ratchet wheel 38. For the configuration shown in FIG. 1, this corresponds to a "nose down" position of the horizontal stabilizer. The ratchet teeth of the lower ratchet wheel are configured to permit rotation of the ratchet wheel in the "opposing" direction. In the "aiding" direction, the ballscrew flange cannot turn unless it overcomes the frictional force resulting from the tight engagement of the brake disk 34 between the underside of the ballscrew flange 30 and upper side of the ratchet wheel 38. For this same situation, essentially no resistive force is applied in either direction by the upper brake disk 32 and upper ratchet wheel 36 due to the compressive force on the ballscrew which results in a loose fit of these components at the top.

It will be appreciated that the same relationship applies for the upper brake disk 32 and upper ratchet wheel 36 with connecting pawls 40 for a nose up condition of the horizontal stabilizer, which results in an upward directed (tensile) force applied to the ballscrew 18c. In that case, the lower brake disk 34 and ratchet wheel 38 apply essentially no resistance to turning of the ballscrew in either direction because the ballscrew flange 30 is lifted upward against brake disk 32 and ratchet wheel 36. The teeth on the upper ratchet wheel 36 are oriented to permit free rotation of the ballscrew in the opposing direction; but to turn the ballscrew in the aiding direction, the ballscrew flange 30 must slip relative to the brake disk 32 and upper ratchet wheel 36 against which it is tightly engaged.

Further, the applied torque of the no-back device is a function of the tension or compression applied to the ballscrew 18c. Thus, there is at least a rough approximation of the ideal relationship where the bi-directional no-back device 24c applies no or at least very limited resistance to turning of the ballscrew in the opposing direction, but substantial force in the aiding direction, and the brake force and hence torque increases as the applied force $T_{LOAD}$ increases.

Viewed in another way, the motor used to trim the horizontal stabilizer meets resistance from substantially only the aerodynamically applied force $T_{LOAD}$ when turning in the opposing direction, but must slip the brake when turning in the aiding direction, regardless of whether the ballscrew 18c is under compression or tension.

In known bi-directional no-back devices of the type shown in FIG. 4, various types of materials have been used for the brake disks 32 and 34, sometimes in a dry environment, and sometimes in a wet environment such as an oil filled housing. The coefficient of friction is an important consideration because of the desirability of having the applied torque $T_{MIN}$ be the same for both directions. Carbon disks in an oil filled housing have been used, but may fade rapidly due to heating when run at high loads. Also, brake torque decreases with time as a result of polishing of the brake surfaces. At very low loads, this type of brake can slip due to formation of a hydrodynamic film of oil between the contacting surfaces. For this reason, springs have been used to preload the brake disks.

Bronze disks in a dry environment have been found to have acceptable wear characteristics up to a point, and then wear rate increases drastically. The boundary between the conditions for acceptable and unacceptable brake wear are not completely understood. The uncertain wear characteristics require in-service monitoring of ballscrew backlash to ensure that the actuator is within wear limits. Also, it has been found that the coefficient of friction varies from disk to disk.

Figure 5:
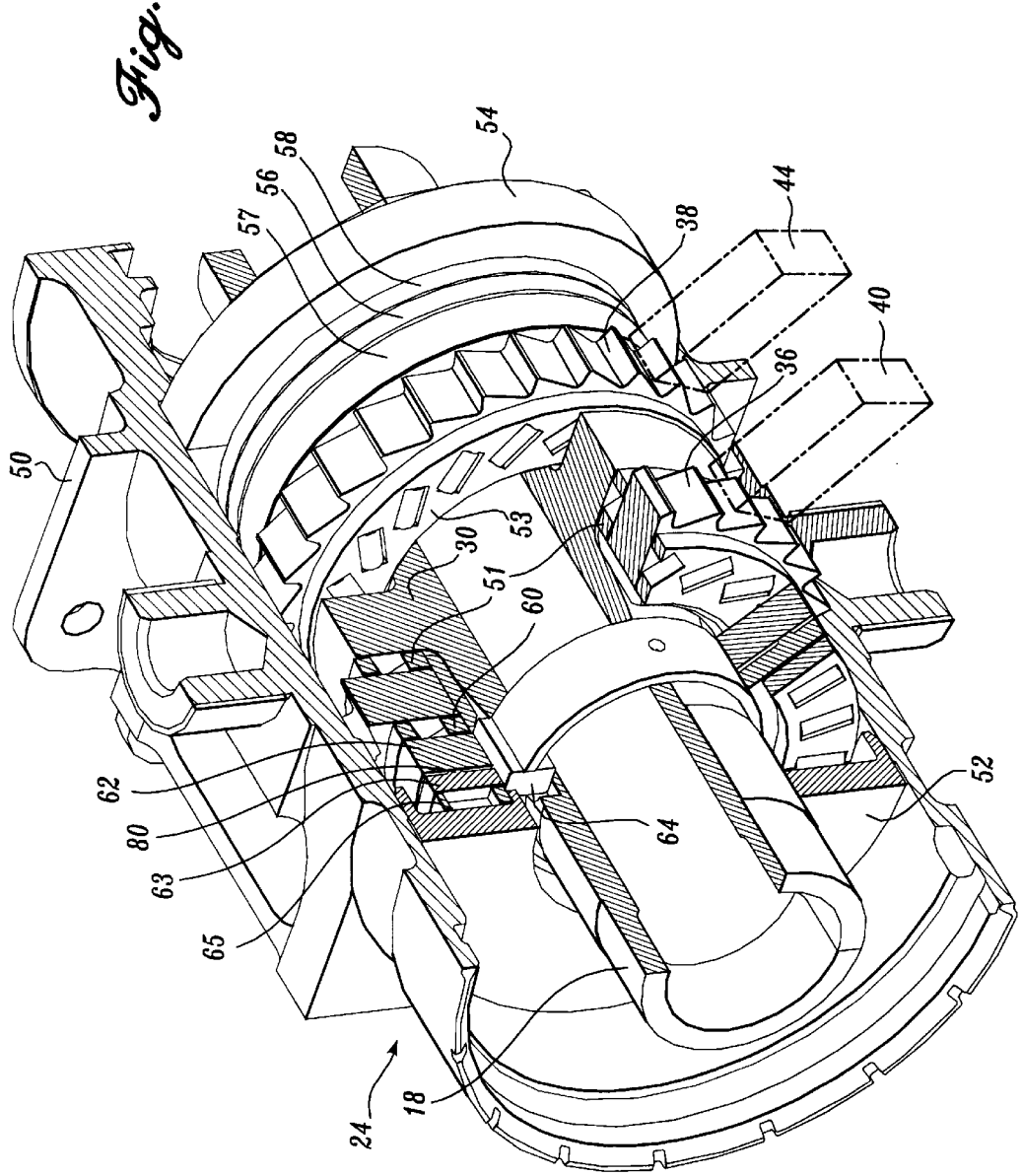
FIG. 5 is a perspective view of a bi-directional ballscrew no-back device in accordance with the present invention, with parts broken away.
Figure 6:
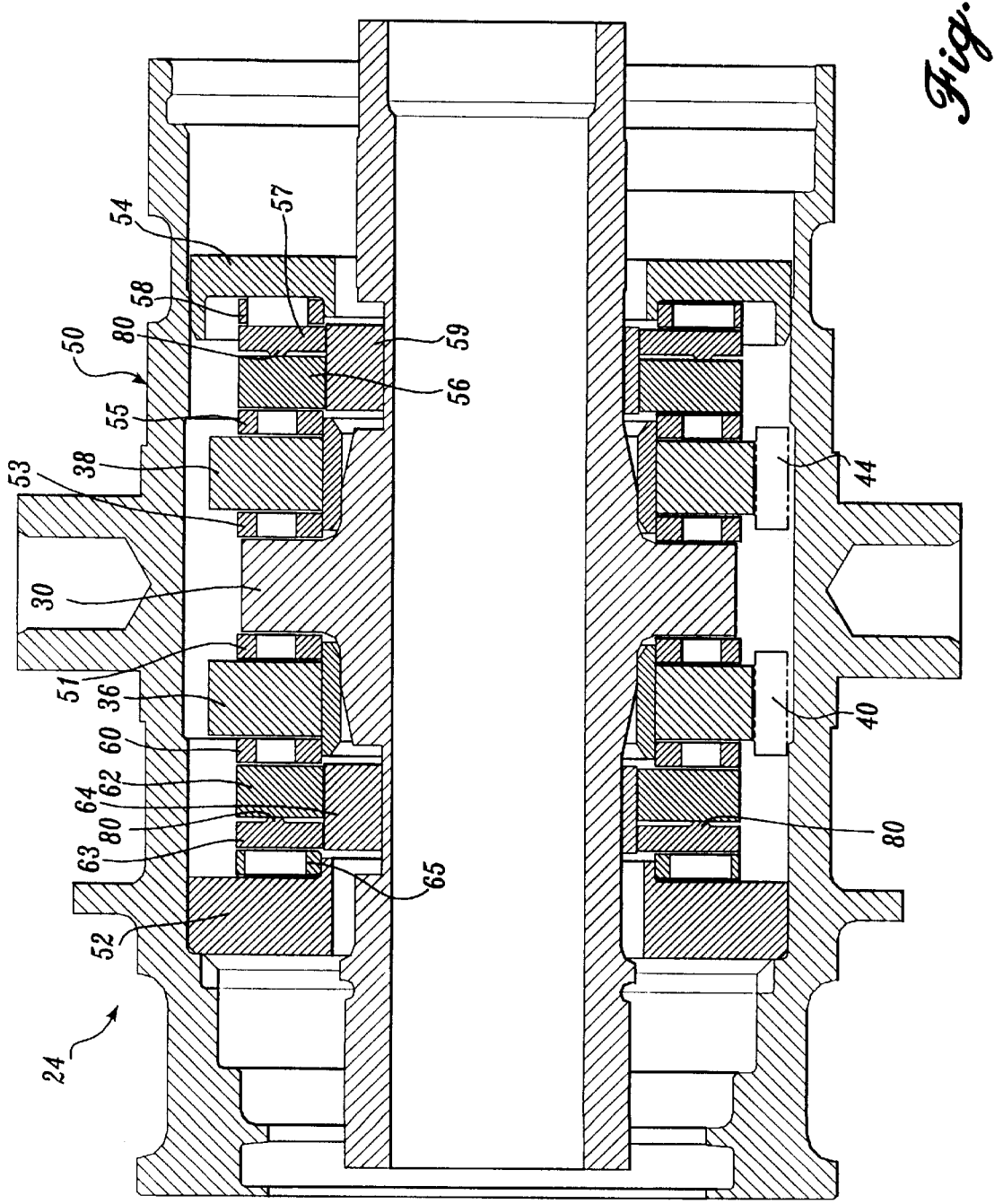
FIG. 6 is an axial section of the bidirectional ballscrew no-back device of FIG. 5.

The improved bi-directional ballscrew no-back device 24 in accordance with the present invention is shown in FIGS. 5 and 6. The housing 50 of the no-back device has a top stationary end plate 52 through which the long, hollow, cylindrical ballscrew 18 extends. In the preferred embodiment the housing is sealed and filled with lubricant, preferably hydraulic oil because of its consistent viscosity over a wide temperature range. The housing also includes a stationary bottom end plate 54. The ballscrew has the usual radial ballscrew flange 30. An upper brake ring 51 rests on the flat upper side of the ballscrew flange, and a lower brake ring 53 is disposed below the ballscrew flange. The brake rings 51 and 53 are sandwiched between the ballscrew flange and upper and lower ratchet wheels 36 and 38 of conventional design except that the ratchet wheels 36 and 38 are mounted for free axial movement along the ballscrew. The ratchet wheels cooperate with upper and lower pawl mechanisms 40 and 44 (represented diagrammatically in broken lines in FIG. 5) which are conventional and are mounted in the housing.

Toward the bottom of the housing, the underside of the lower ratchet wheel 38 rests against a third brake ring 55 (not visible in FIG. 5) which, in turn, rests on a two part thrust plate assembly 56, 57 and a thrust bearing 58. The upper thrust plate 56 has a flat upper surface, such that the lowermost brake ring 55 is sandwiched between the flat undersurface of the bottom ratchet wheel 38 and the flat upper surface of the thrust plate 56. The thrust plate assembly 56, 57 is slidable axially relative to the ballscrew but is connected thereto by a key or spline 59 so that the thrust plates rotate with the ballscrew.

Proceeding upward from the upper ratchet wheel 36, there is a fourth brake ring 60 immediately above the upper ratchet wheel 36, and a second two part thrust plate assembly 62, 63 which is slidable axially along the ballscrew 18, but which is connected thereto by a key or spline 64 such that the thrust plates 62, 63 rotate with the ballscrew. A top thrust bearing 65 is interposed between the top thrust plate 63 and the underside of the housing upper end plate 52.

Regardless of the direction of the vertical load on the ballscrew, there are two stages of brake force applied. In the case of a compressive load, the underside of the ballscrew flange 30 is pressed against brake ring 53 which, in turn, is pressed against the upper side of ratchet wheel 38; and the underside of ratchet wheel 38 is pressed against brake ring 55 which, in turn, is pressed against the upper surface of the upper thrust plate 56. The lower pawl 44 reacts with the lower ratchet wheel 38 to permit essentially free rotation in the opposing direction, but prevent rotation in the aiding direction without overcoming the frictional force of the multi-stage brake. The situation is similar for a tensile load applied to the ballscrew. In that case, the upper side of the ballscrew flange 30 bears against the brake ring 51 which, in turn, bears against the upper ratchet wheel 36. The upper surface of ratchet wheel 36 bears against brake ring 60 which, in turn, bears against the underside of the thrust plate 62. The upper pawl mechanism 40 permits freewheeling of the ratchet wheel and, consequently, the ballscrew in the opposing direction, but prevents turning of the ratchet wheel relative to the housing in the aiding direction. In the aiding direction, the ball flange will not be allowed to turn until the braking force is overcome, i.e., by the electric motor.

Figure 7:
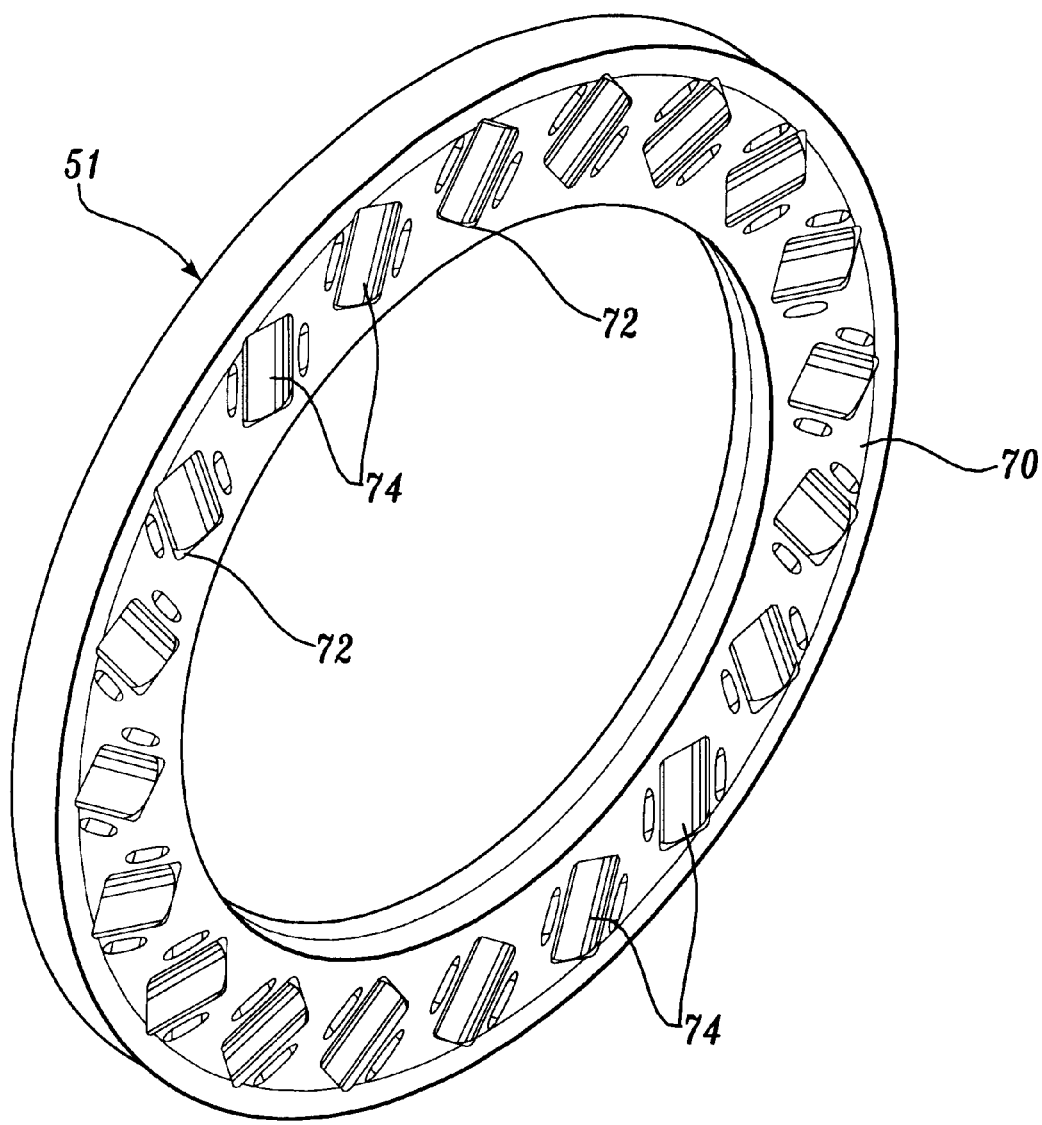
FIG. 7 is a top perspective of a skewed roller brake ring used in a bi-directional ballscrew no-back device in accordance with the present invention.
Figure 8:
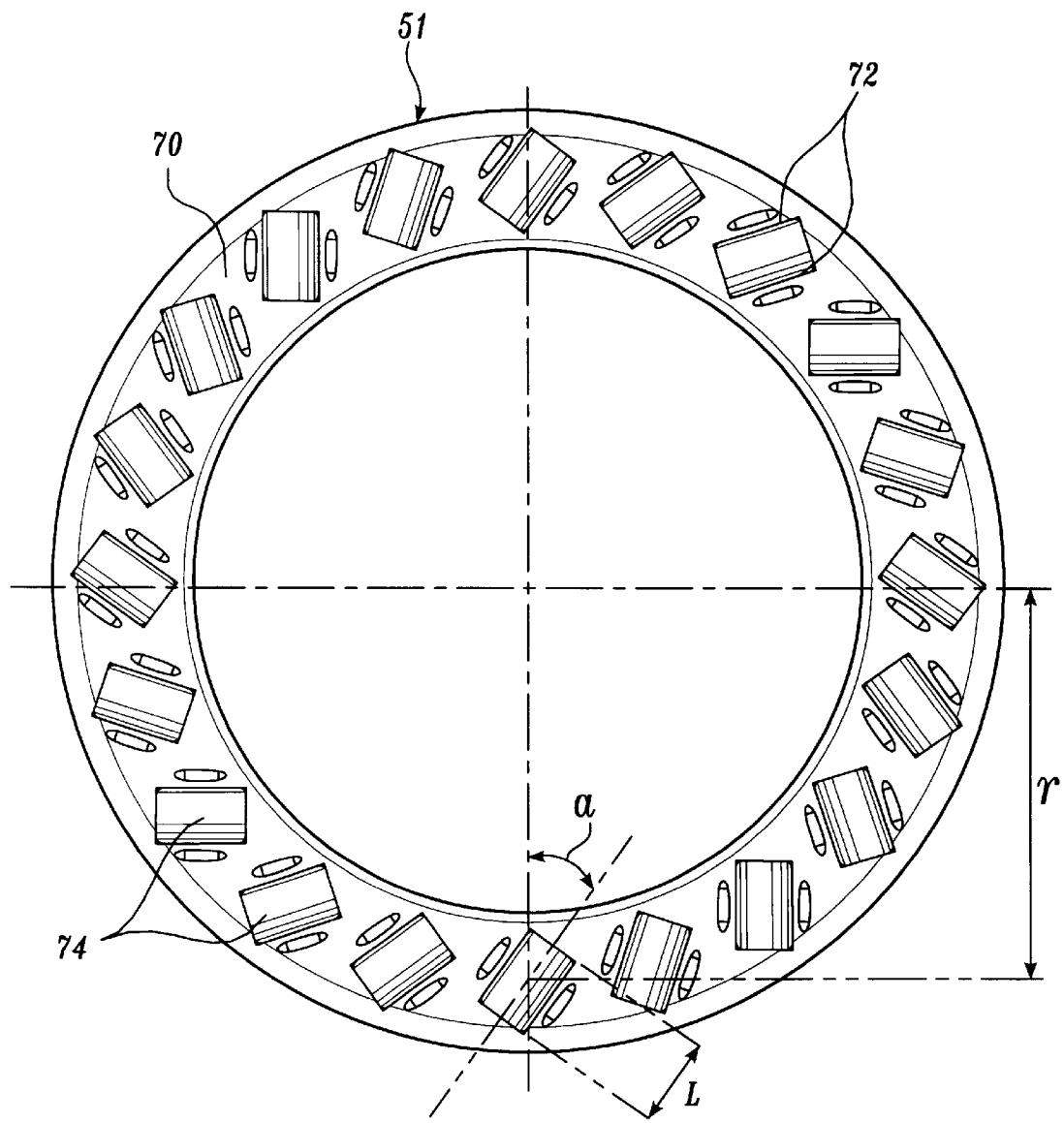
FIG. 8 is an end elevation of the brake ring of FIG. 5.

In the preferred embodiment, each of the brake rings is of the design shown in FIG. 7 and FIG. 8. Brake ring 51 is shown, but rings 52, 55, and 60 are identical. The brake ring consists of an annular frame or cage 70 having multiple, circumferentially spaced openings 72 for cylindrical rollers 74. The axis of each roller is skewed at an angle a relative to a diameter intersecting the center of the roller. In addition, the centers of the rollers define a circle having a radius r (referred to as the "brake effective radius"), and each roller is of a length L. The skew angle a, radius r, and roller length L all affect the effective coefficient of friction for the composite brake ring.

In order to balance the brake rings against the surfaces with which they interact, at least three rollers are required, spaced equiangularly around the circumference of the annular cage 70. In practice, the number of rollers is selected based on the maximum operating load. The greater the number of rollers, the less the load applied by each between the respective plates with which it is engaged. For AISI 52100 steel rollers and SAE 9310 carburized steel plates (which is the same material as the ballscrew and its flange), preferably the individual load or contact stress is kept below 200 ksi. With reference to FIGS. 5 and 6 preferably each of the outer thrust plates 57, 63 has an inward-directed circumferential rib 80 aligned with the circle of the effective brake radius for centering the load on the rollers.

The effective coefficient of friction $\mu_{eff}$ for each brake ring is affected by the materials used, roller length, brake effective radius r, and skew angle a, but not by the number of rollers. The effective coefficient of friction $\mu_{eff}$ can be determined experimentally or analytically.

Brake gain (the ratio between brake torque $T_{MIN}$ and air-induced torque $T_{LOAD}$) is approximately:

$$G = \frac{2\pi S \mu_{eff} r}{L}$$

where S is the number of brake stages, e.g., two in the illustrated embodiment.

In the preferred embodiment, skew angle a is 36°, effective brake radius r is 1.42 inches, roller diameter is 0.1969 (5 millimeters) and roller length L is 0.315 inch (8 millimeters). The preferred materials are AISI 52100 steel for the rollers and SAE 9310 carburized steel for the other brake components. This results in $\mu_{eff}$ being 0.0998 when the rollers are new, changing to about 0.0824 after wear-in. Brake gain when new is approximately 2.85 and after wear-in approximately 2.35. The skewed roller brake ring does not have the brake fade nor adverse wear characteristics as described above for the existing bi-directional no-back devices. In addition, readily available materials may be used for the rollers, roller cage, ballscrew (including the ball flange), and cooperating thrust plates which preferably are the same material as the ballscrew.

While the preferred embodiment of the invention has been illustrated and described, it will be appreciated that various changes can be made therein without departing from the spirit and scope of the invention. For example, while two brake stages are shown for each axial direction, more than two stages could be used, and the number of stages need not be the same for the different directions. Skew angle, brake effective radius, and the other parameters can be changed for different applications.

What is claimed is:

1. A no-back device comprising;
    a ballscrew rotatable in opposite directions and having a ballscrew flange with radial surfaces at opposite sides thereof and rotatable with the ballscrew, the ballscrew receiving and transferring a bi-directional axial and torque load from an external source;
    a housing receiving a section of the ballscrew including the ballscrew flange and permitting limited axial movement of the ballscrew in the housing; and
    a multi-stage brake mounted in the housing and including:
        first and second ratchet wheels rotatable relative to the ballscrew and mounted at opposite sides of the ballscrew flange, each of the ratchet wheels having flat radial surfaces at opposite sides thereof parallel to the radial surfaces of the ballscrew flange;
        a first skewed roller brake ring sandwiched between the ballscrew flange and the first ratchet wheel;
        a second skewed roller brake ring sandwiched between the ballscrew flange and the second ratchet wheel;
        first and second thrust plate assemblies disposed, respectively, at opposite sides of the first and second ratchet wheels and having flat radial surfaces facing the ballscrew flange and parallel to the radial surfaces of the ballscrew flange, said thrust plate assemblies being mounted for rotation with the ballscrew;
        a third skewed roller brake ring disposed between the first ratchet wheel and the first thrust plate assembly;
        a fourth skewed roller brake ring disposed between the second ratchet wheel and the second thrust plate assembly;
        the first and second thrust plate assemblies being moveable axially of the ballscrew in the housing for transfer of compressive loads exerted on the ballscrew in one direction and tensile loads exerted on the ballscrew in the other direction for maintaining the first and third skewed roller brake rings in tight frictional engagement with the ballscrew flange, first ratchet wheel and first thrust plate assembly or the second and fourth skewed roller brake rings in tight frictional engagement with the ballscrew flange second ratchet wheel and second thrust plate assembly depending on the direction of the external force applied to the ballscrew; and
        first and second pawl assemblies mounted on the housing and cooperating with the first and second ratchet wheels to permit freewheeling of the first ratchet wheel in a first direction and freewheeling of the second ratchet wheel in the opposite direction, for controlling the effective brake torque applied by the multi-stage brakes.

2. The no-back device defined in claim 1, in which each of the skewed roller brake rings includes an annular cage with skewed rollers mounted therein, the skewed rollers having centers defining a circle, and the thrust plate assemblies having inward facing annular ribs aligned with the circle defined by the centers of the rollers.

* * * * *